(12) United States Patent
Markarian et al.

(10) Patent No.: US 7,000,406 B2
(45) Date of Patent: Feb. 21, 2006

(54) GAS TURBINE COMBUSTOR SLIDING JOINT

(75) Inventors: Lorin Markarian, Etobicoke (CA); Dany Blais, Ste. Julie (CA)

(73) Assignee: Pratt & Whitney Canada Corp., Longueuil (CA)

( * ) Notice: Subject to any disclaimer, the term of this patent is extended or adjusted under 35 U.S.C. 154(b) by 67 days.

(21) Appl. No.: 10/725,578

(22) Filed: Dec. 3, 2003

(65) Prior Publication Data

US 2005/0120718 A1   Jun. 9, 2005

(51) Int. Cl.
*F02C 7/00* (2006.01)

(52) U.S. Cl. .......................................... 60/796; 60/800

(58) Field of Classification Search .................. 60/796, 60/798, 799, 800, 804, 39.37, 805; 29/890.01
See application file for complete search history.

(56) References Cited

U.S. PATENT DOCUMENTS

| | | | |
|---|---|---|---|
| 3,286,461 A | 11/1966 | Johnson | |
| 3,302,926 A | 2/1967 | Bobo | |
| 3,529,906 A | 9/1970 | Borden et al. | |
| 3,670,497 A | 6/1972 | Sheldon | |
| 4,195,476 A * | 4/1980 | Wood ........................... | 60/737 |
| 4,635,332 A | 1/1987 | Cederwall et al. | |
| 4,668,164 A | 5/1987 | Neal et al. | |
| 4,702,670 A | 10/1987 | Winter | |
| 4,798,514 A | 1/1989 | Pask | |
| 4,821,522 A | 4/1989 | Matthews et al. | |
| 4,889,469 A | 12/1989 | Wilkinson | |
| 5,078,576 A | 1/1992 | Hayton | |
| 5,398,496 A * | 3/1995 | Taylor et al. .................. | 60/796 |
| 5,407,319 A | 4/1995 | Harrogate et al. | |
| 5,417,545 A | 5/1995 | Harrogate | |
| 5,470,198 A | 11/1995 | Harrogate et al. | |
| 6,269,628 B1 * | 8/2001 | Gates ........................... | 60/804 |

FOREIGN PATENT DOCUMENTS

| | | |
|---|---|---|
| GB | 1 089 660 | 11/1967 |
| GB | 1 091 573 | 11/1967 |
| GB | 2 102 897 | 2/1983 |

OTHER PUBLICATIONS

Pratt & Whitney Canada JT15D-5F Maintenance Manual, selected pages from Chapter 72-50—Turbine Section.

* cited by examiner

*Primary Examiner*—Ehud Gartenberg
(74) *Attorney, Agent, or Firm*—Ogilvy Renault LLP

(57) ABSTRACT

An assembly for a gas turbine engine, the assembly comprising a combustor and a vane assembly downstream from the combustor. The vane assembly includes at least one airfoil radially extending between an inner and outer platform defining an annular gas path therebetween. At least the outer platform forms a first sliding joint connection with an adjacent outer combustor wall such that radial sealing between the outer platform and the outer combustor wall is provided at engine operating temperature, while permitting relative axial displacement therebetween.

14 Claims, 3 Drawing Sheets

GAS TURBINE COMBUSTOR SLIDING JOINT

TECHNICAL FIELD

The present invention relates generally to gas turbine engines, and more particularly to a joint between a high pressure turbine vane platform and a combustor flange therein.

BACKGROUND OF THE INVENTION

Secure and well sealed inter-engagement of the combustor and the high pressure, turbine (HPT) stage immediately downstream therefrom is vital in a gas turbine engine. This portion of the engine experiences the highest temperatures, and therefore the joint formed between the combustor and the HPT vane assembly must be able to accommodate thermal deflections of the two structures due to the high temperatures. Thermal growth mismatch between the combustor walls and the platforms of the HPT vane may occur for a variety of reasons, such as a result of differences in materials, structure, surface temperatures and gas flow patterns for example. Accordingly, the joints linking these two structures must be able to accommodate these deflections, without reducing sealing effectiveness. A tight seal therebetween is required to prevent high pressure air, typically fed to the regions around the combustor, from leaking into the lower pressure gas path flowing through the turbine section.

Known joints between the combustor walls and the downstream HPT vane platforms, and especially the radially outer joints between the outer combustor wall and the outer HPT vane platform, are often excessively complex, typically having a plurality of parts and employing permanent fastening means such as rivets or bolts.

SUMMARY OF THE INVENTION

It is accordingly an object of the present invention to provide an improved combustor joint in a gas turbine engine.

It is another object of the present invention to provide an improved joint between a high pressure turbine vane outer platform and a combustor outer flange in a gas turbine engine.

Therefore, in accordance with the present invention, there is provided an assembly for a gas turbine engine, the assembly comprising a combustor and a vane assembly downstream from the combustor, the vane assembly including at least one airfoil radially extending between an inner and outer platform defining an annular gas path therebetween, wherein at least the outer platform forms a first sliding joint connection with an adjacent outer combustor wall such that radial sealing between the outer platform and the outer combustor wall is provided at engine operating temperature while permitting relative axial displacement therebetween.

There is also provided, in accordance with the present invention, an assembly for a gas turbine engine, the assembly comprising: a combustor having a combustor wall circumscribing a gas path therewithin and an exit duct end, the exit duct end having an outer flange portion radially spaced from the combustor wall in a direction away from the gas path to form an annular slot; a vane assembly disposed downstream of the combustor, the vane assembly including at least one airfoil extending between an inner and an outer platform; and a portion of at least the outer platform extending in the annular slot defined between the combustor wall and the outer flange portion, the portion being retained by the combustor wall and the outer flange portion such that the vane assembly is mounted to the combustor and sealed therewith.

There is also provided, in accordance with the present invention, a method of sealing a joint in an assembly for a gas turbine engine, the assembly comprising a combustor and a vane assembly, the method comprising: providing a vane assembly mounted to an exit duct of the combustor, the vane assembly having at least one airfoil extending between an inner and an outer platform, at least the outer platform engaging a flange portion of the combustor exit duct; determining an amount of thermal growth differential exhibited between the flange portion and the at least the outer platform over an engine operating temperature range; and forming a joint between the flange portion and the at least the outer platform such that a spacing distance therebetween at ambient temperature is less than the determined amount of thermal growth differential over the engine operating temperature range, such that the spacing distance closes over the engine operating temperature range to provide a seal between the vane assembly and the combustor.

There is further provided, in accordance with the present invention a combustor for a gas turbine engine, the combustor comprising a combustor body having at least an annular exit end adapted to communicate with a vane assembly, the exit end defined by an inner exit lip and an outer exit lip, the inner and outer exit lips each having a pair of spaced-apart members, each pair of said members adapted to slidingly engage therebetween one of a pair of spaced-apart platforms of the vane assembly, one of said members being an innermost member relative to the combustor and one of said members being an outermost member relative to the combustor, wherein the spaced-apart members are adapted such that said sliding engagement secures the vane assembly to the combustor independent of other retention means when the combustor is assembled with said vane assembly, and wherein at least one of the outermost and innermost members is flexible to thereby permit, in use, said spaced-apart vane platforms to expand apart from one another.

In accordance with the present invention, there is additionally provided a combustor-to-vane joint assembly for a gas turbine engine, the combustor including an annular exit end for mating with an annular vane ring assembly, the vane ring assembly defined by inner and outer platform rings, the joint comprising: inner and outer female retaining members integral with and defining a downstream end of the annular exit, the female retaining members each including spaced-apart annular portions; and inner and outer male insertion members integral with and defining an upstream end of the vane assembly platform rings; wherein the vane assembly is mounted to the combustor solely by insertion of the inner and outer male insertion members between the spaced-apart portions of the respective inner and outer female retaining members.

There is additionally provided, in accordance with the present invention, an assembly for a gas turbine engine, the assembly comprising a combustor having a wall and an exit end, and an exit vane assembly mounted to the exit end on an inner side and an outer side relative to the combustor, the vane assembly including at least an inner platform and an outer platform, wherein the combustor exit end includes a finger element mounted to the combustor and spaced apart from the combustor wall, and wherein the vane assembly outer platform is held between the finger element and combustor wall to thereby mount the vane assembly to the combustor.

BRIEF DESCRIPTION OF THE DRAWINGS

Further features and advantages of the present invention will become apparent from the following detailed description, taken in combination with the appended drawings, in which.

DETAILED DESCRIPTION OF THE PREFERRED EMBODIMENT

Figure 1:
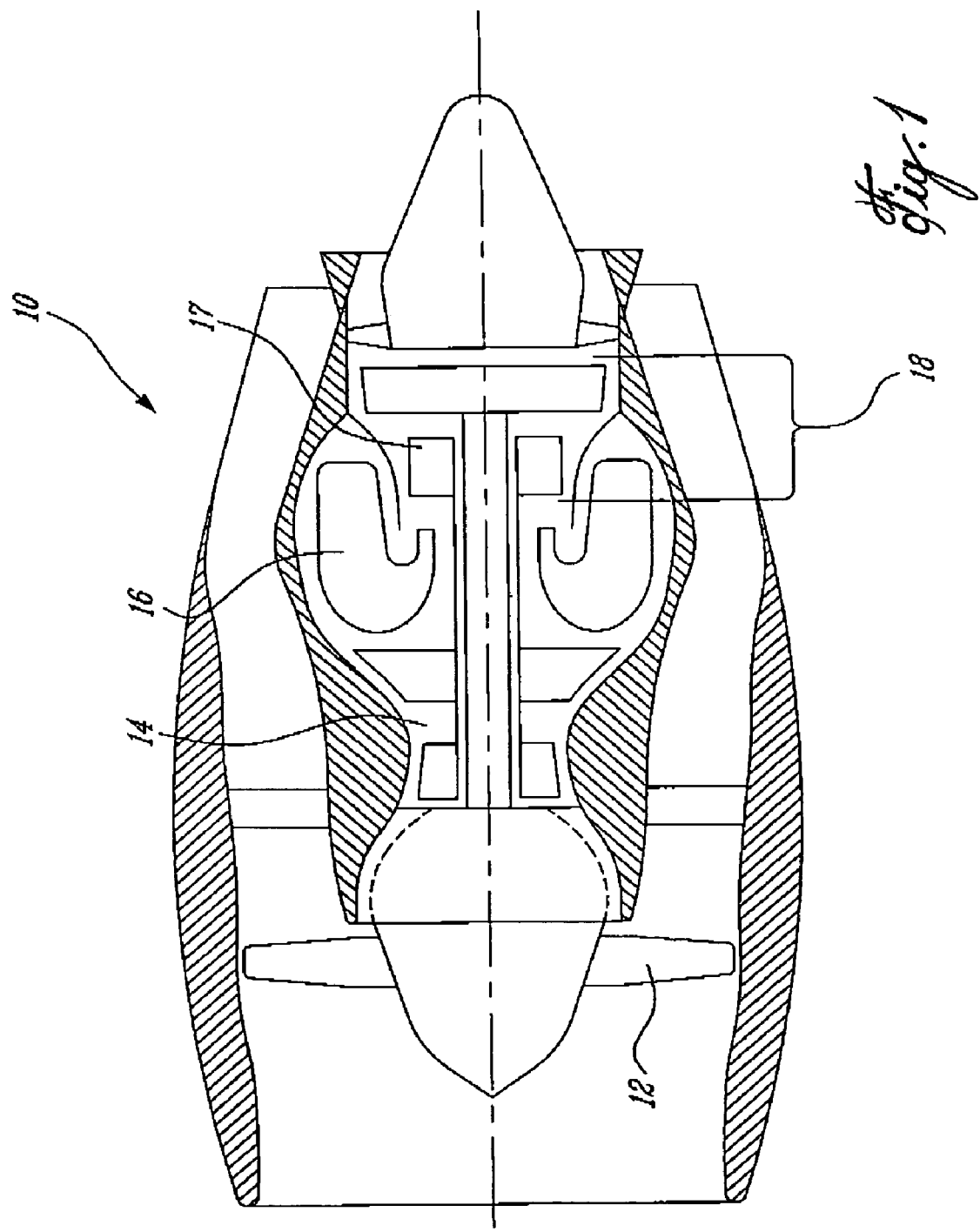
FIG. 1 is a schematic cross-section of a gas turbine engine having a combustor joint in accordance with the present invention.

FIG. 1 schematically illustrates a gas turbine engine 10 (a turbofan preferably adapted for use on an aircraft in subsonic flight in this case, though the invention may be practised in almost any gas turbine engine) generally comprising, in serial flow communication, a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Figure 3:
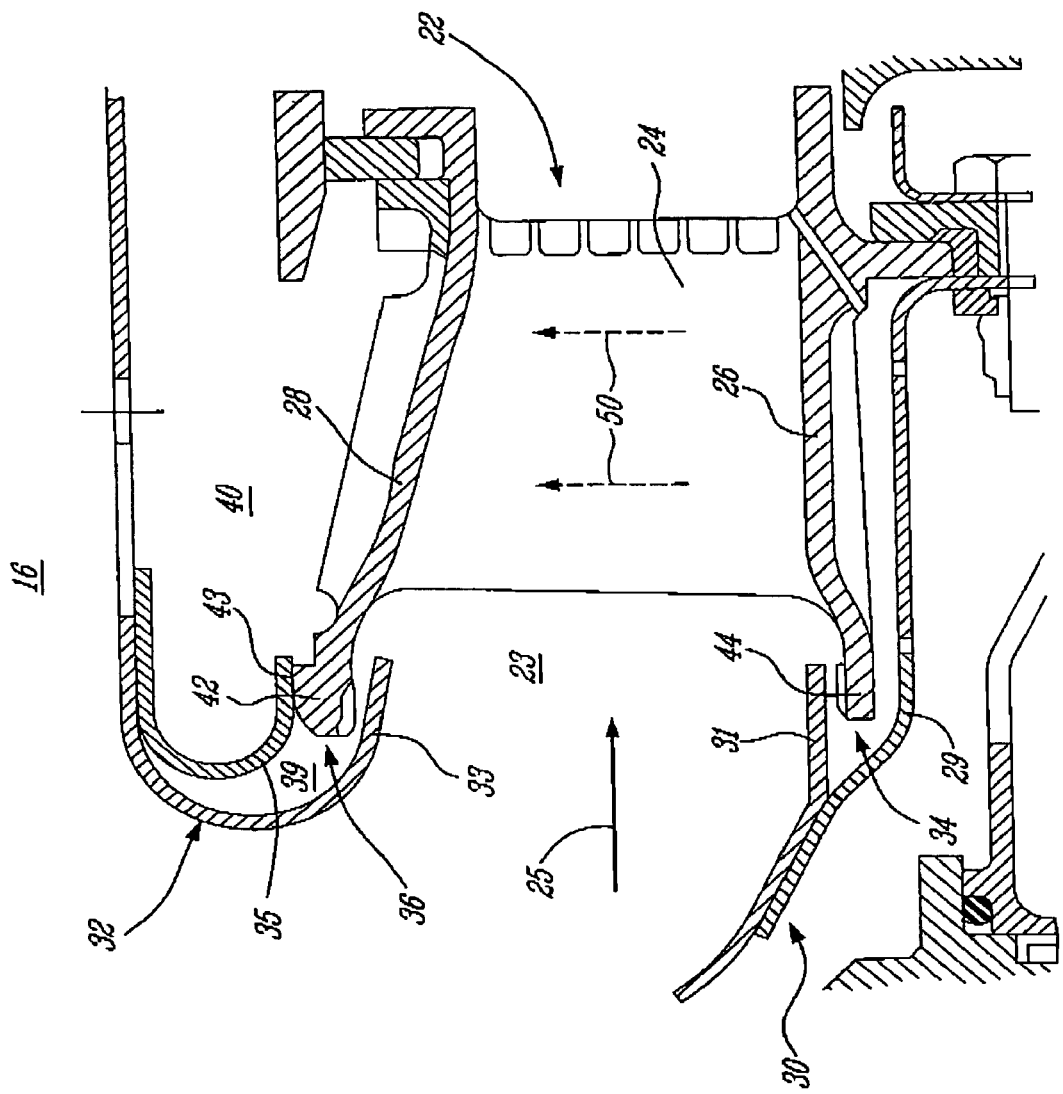
FIG. 3 is a cross-section of a joint between a combustor flange and a high pressure turbine in accordance with the present invention.

The turbine section 18 further comprises at least a first, or high pressure (HP), turbine stage 17 which is immediately downstream from the combustor 16. As seen in FIG. 3, the high pressure turbine stage 17 includes a turbine rotor 20 with a plurality of radially extending turbine blades 21, and a high pressure turbine (HPT) vane assembly 22 immediately upstream therefrom. The joint between the HPT vane assembly 22 and the combustor 16 of the present invention is described in detail below with reference to FIG. 3.

Figure 2:
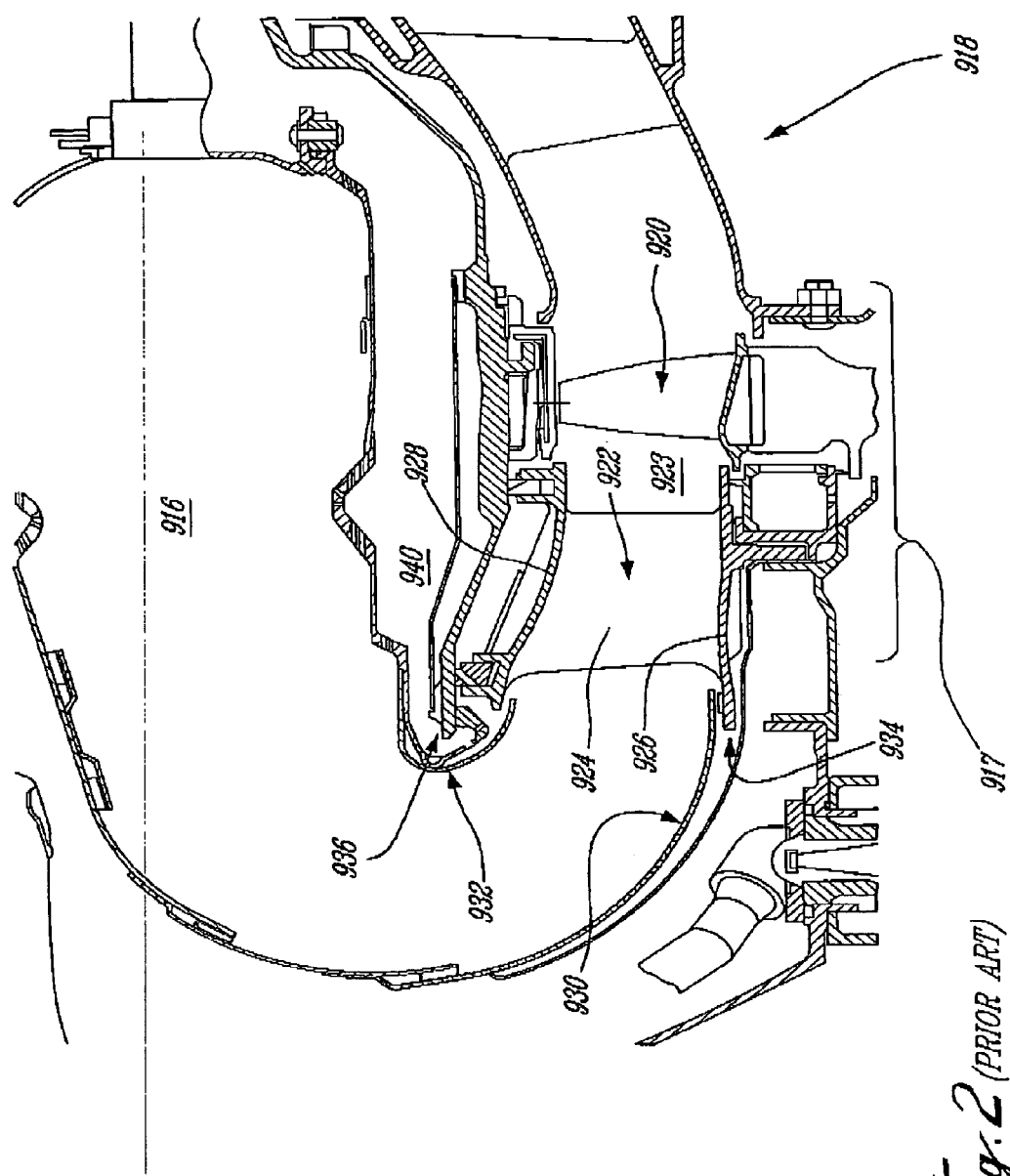
FIG. 2 is a cross-section of a combustor and high pressure turbine of the prior art.

In a prior art gas turbine engine of the prior art as shown in FIG. 2, a reverse flow combustor 916 provides hot combustion gases to a downstream HPT stage 917 of the gas turbine engine's turbine section 918. The HPT stage 917 comprises generally an HPT vane assembly 922 and an HPT rotor assembly 920. The HPT vane assembly 922 includes an airfoil 924 extending between an inner platform 926 and an outer platform 928, which define an annular passage 923 therebetween for directing the hot gases therethrough. The radially inner platform 926 of the PHT vane assembly 922 is engaged to a first, or radially inner, wall 930 of the combustor 916 by an inner joint 934. The radially outer platform 928 is engaged to a second, or radially outer, wall 932 of the combustor. The inner joint 934 is a sliding-type joint, wherein axial movement of the inner platform 926 relative to the combustor inner wall 930 is possible. The outer joint 936 is much more complex, typically employing fastening members such as rivets or bolts to fasten the inner platform 928 of the HPT vane assembly 922 to the outer wall 932 of the combustor. Such an outer joint 936 therefore securely fixes the outer platform 928 in place on the combustor outer wall 932 such that an adequate seal therebetween is ensured. A tight seal therebetween is required to prevent high pressure air, typically fed to the regions 940 around the combustor 916, from leaking into the lower pressure gas path flowing through the turbine section 918.

Referring now to FIG. 3, the inter-engagement between the combustor 16 and the HPT vane assembly 22 of the present invention is clearly seen. The HPT vane assembly 22 comprises a plurality of airfoils 24 radially extending between inner platforms 26 and outer platforms 28, which are circumferentially disposed about a central longitudinal axis of the gas turbine engine to define an annular passage 23 therebetween, within which the hot combustion gases are channelled in direction 25. The HPT vane assembly 22 is located immediately downstream from the combustor 16, and is accordingly engaged thereto at the combustor exit. Generally, the vane inner platform 26 of the HPT vane assembly 22 is engaged to a first, or radially inner, wall 30 of the combustor 16 by an inner joint assembly 34, and the vane outer platform 28 is engaged to a second, or radially outer, wall 32 of the combustor 16 by an outer joint assembly 36.

An integral upstream lug portion 44 of the vane inner platform 26 extends upstream from the leading edge of the vane airfoil 24, and projects into an annular slot defined between an outer flange portion 31 and an inner flange portion 29 of the combustor inner wall 30. The inner joint assembly 34 accordingly formed, permits the upstream lug portion 44 of the vane inner platform 26 to be relatively displaceable within the flange portions of the combustor inner wall 30. Particularly, the inner joint assembly 34 is a sliding-type joint, which permits the upstream lug portion 44 of the vane inner platform 26 to axially slide within the flange portions of the combustor inner wall 30 in a direction substantially parallel to the direction 25 of the hot gas flow. The inner joint assembly 34 also permits a small amount of radial displacement of the upstream lug portion 44 relative to the inner and outer flange portions 29 and 31 of the combustor inner wall 30.

Referring now to the outer joint assembly 36 between the HPT vane assembly 22 and the upstream combustor 16, an upstream lug portion 42 of the vane outer platform 28 projects upstream from the leading edge of the vane airfoil 24, for engagement with the outer wall 32 of the combustor 16. The combustor's outer wall 32 comprises an inner flange portion 33 which is preferably integrally formed with the main wall of the combustor, and an outer flange portion, or finger portion, 35 which define annular space-apart portions of the exit of the combustor. The inner flange portion 33 and the outer flange portion 35 define a radial gap or slot 39 therebetween. The upstream lug portion 42 of the vane outer platform 28 freely extends within the radial slot 39, such that relatively displacement between the upstream lug portion 42 and the combustor outer wall 32 is possible. Particularly, the upstream lug portion 42 is able to axially slide therewithin. Accordingly, the outer joint assembly 36 is also a sliding-type joint, and provides a sealing joint which is able to accommodate thermal deflection of the parts without requiring any locating fasteners such as rivets or bolts.

Each upstream lug portion 42 of the vane outer platforms 28 has an outer sliding surface 43, which is adapted to abut the outer flange portion 35 of the combustor outer wall 32 when the gas turbine engine is in operation, thereby forming a "pinching" effect which ensures a seal formed therewith. A tight seal is required to prevent the high pressure air fed to the region 40 around the combustor 16 from leaking into the lower pressure gas path flowing through the HPT stage 17 of the turbine section 18. Particularly, during operation of the gas turbine engine 10, the hot combustion gases flowing through the annular passage 23 tend to cause thermal growth of the HPT vane assembly 22, and therefore the outer platform 28 thereof, generally in the radial direction 50 as indicated in FIG. 3. While one would typically expect corresponding thermal growth of the combustor walls, the outer flange portion 35 of the combustor outer wall 32 generally does not expand as much, as it is not in direct contact with the hot combustion gases and is exposed to the cooler high pressure air fed to the region 40 surrounding the combustor 16. Accordingly, the outer flange portion 35 experiences lower thermal growth in a radially outward direction than does the upstream lug portion 42. This resulting thermal growth differential causes a radial pinching effect in the sliding outer joint assembly 36, particularly between the outer flange portion 25 of the combustor outer wall 32 and the upstream lug portion 42 of the vane outer platform 28, which helps seal the connection between the HPT vane assembly 22 and the combustor 16. Additionally, the outer flange portion 35 of the combustor outer wall 32 is preferably composed of sheet metal, where as at least the outer platform 28 of the vane assembly 22 is cast. This further contributes to the thermal growth differential between the two parts, permitting the outer flange portion 35 to stay relatively cool while the vane assembly radially expands.

Such sliding joint connections between both the vane outer and inner platforms 28,26 and the corresponding combustor walls 32,30, significantly improve the engagement between the HPT vane assembly 22 and the combustor 16 at engine operating temperature. In comparison with typical prior art combustor-HPT vane joints, the outer and inner joint assemblies 34,36 of the present invention, and particularly the outer joint assembly 36, comprise fewer parts, require no permanent fasteners such as rivets or bolts, and provide improved sealing as a result of the thermal growth differential between the vane outer platform 28 and the cooler combustor outer flange portion 35. In all gas turbine engines, and particularly those intended for aerospace applications, weight and cost considerations are of prime importance. Accordingly, reducing the number of parts and simplifying their design is a constant goal of all aerospace designers and engineers. The combustor sliding joint assemblies 34,36 of the present invention achieve this by providing sealing connections which have fewer, less complex parts, thereby greatly simplifying the connection between the HPT vane assembly 22 and the combustor 16, particularly at the outer joint assembly 36 between the vane outer platform 28 and the combustor outer wall 32.

Further, known combustors joints are concerned primarily with providing adequate sealing, however typically offer little in the way of structural support for mounting of the HPT vane assemblies. Therefore, separate structures are often provided to handle each of these requirements. As the combustor joints 34,36 of the present invention provide by sealing and some structural mounting benefits, significant reductions in the complexity and overall weight are provided over known prior art combustor-vane assemblies.

The embodiments of the invention described above are intended to be exemplary. Still other modifications are available, and those skilled in the art will therefore appreciate that the forgoing description is illustrative only, and that various alternatives and modifications can be devised without departing from the spirit of the present invention. Accordingly, the present invention is intended to embrace all such alternatives, modifications and variances which fall within the scope of the appended claims.

What is claimed is:

1. An assembly for a gas turbine engine, the assembly comprising a combustor and a vane assembly downstream from the combustor, the vane assembly including at least one airfoil radially extending between an inner and outer platform defining an annular gas path therebetween, wherein a portion of at least the outer platform mates with an adjacent outer combustor wall to form a first sliding joint connection therebetween such that both relative radial and axial displacement between the outer platform and the outer combustor wall is permitted, said first sliding joint defining a radial gap between facing surfaces of said portion of the outer platform and the outer combustor wall at a first temperature less than engine operating temperature, said facing surfaces being mutually disposed in radial sealing engagement at said engine operating temperature, wherein the inner platform forms a second sliding joint connection with an adjacent inner combustor wall, the second sliding joint connection permitting at least relative axial displacement between the inner platform and the inner combustor wall while maintaining a radial seal therebetween.

2. The assembly as defined in claim 1, wherein the outer platform and the inner platform include upstream ends which respectively mate with the outer and inner combustor walls to form the first and second sliding joint connections.

3. The assembly as defined in claim 2, wherein the upstream ends of the outer platform and the inner platform project upstream from a leading edge of the airfoil.

4. The assembly as defined in claim 3, wherein the outer and inner combustor walls comprise a bifurcated flange at an exit of the combustor, the bifurcated flange having a first flange portion and a second flange portion radially spaced apart from the first flange portion in a direction away from the annular gas path, thereby defining an annular gap between the first flange portion and the second flange portion.

5. The assembly as defined in claim 4, wherein the upstream ends of the outer platform and the inner platform are receivable within the annular gap.

6. The assembly as defined in claim 5, wherein the upstream end of at least the outer platform includes a sliding surface facing radially outward, the sliding surface being adapted for pressed abutment with the second flange portion at engine operating temperature such that a seal therebetween is formed.

7. An assembly for a gas turbine engine, the assembly comprising:
 a combustor having a combustor wall circumscribing a gas path therewithin and an exit duct end, the exit duct end having an outer flange portion radially spaced from the combustor wall a first distance in a direction away from the gas path to form an annular slot;
 a vane assembly disposed downstream of the combustor, the vane assembly including at least one airfoil extending between an inner and an outer platform; and
 a portion of at least the outer platform extending in the annular slot defined between the combustor wall and the outer flange portion, said portion having a thickness in said direction less than said first distance such that a gap is defined between the portion of the outer platform and one of the combustor wall and the outer flange portion at room temperature, the portion being retained by the combustor wall and the outer flange portion and being disposed in radial sealing engagement with said one of the outer combustor wall and the outer flange portion at engine operating temperature, such that the vane assembly is mounted to the combustor and sealed therewith, wherein a sliding joint connection is provided between each of the inner and outer platforms of the vane assembly and the combustor, the sliding joint connections extending axially, thereby permitting at least relative axial displacement between the vane assembly and the combustor while maintaining a radial seal therebetween.

8. The assembly as defined in claim 7, wherein the sliding joint connection includes the portion of at least the outer platform, the portion of at least the outer platform being an upstream end thereof having a sliding surface, the sliding surface being adapted for pressed abutment with the outer flange portion at engine operating temperature such that a radial seal therebetween is formed.

9. The assembly as defined in claim 7, wherein the outer flange portion circumscribes the combustor exit duct end, and a portion of the inner platform of the vane assembly extends between the combustor wall and the outer flange portion.

10. The assembly as defined in claim 9, wherein a second sliding joint connection is provided between the inner platform and the combustor exit duct end.

11. The assembly as defined in claim 7, wherein the outer flange portion comprises a first thermal expansion coefficient and the outer platform comprises a second thermal expansion coefficient, the second thermal expansion coefficient being greater than the first thermal expansion coefficient.

12. The assembly as defined in claim 7, wherein the outer flange portion is in contact with cool air relative to the gas path to which the outer platform is exposed such that a thermal growth differential exits between the outer flange portion and the outer platform, thereby causing the outer platform to expand sufficiently more than the outer flange portion to form a seal therebetween.

13. A combustor-to-vane joint assembly for a gas turbine engine, the combustor including an annular exit end for mating with an annular vane ring assembly, the vane ring assembly defined by inner and outer platform rings, the joint comprising:

inner and outer female retaining members integral with and defining a downstream end of the annular exit, the female retaining members each including annular portions spaced-apart by a first distance; and inner and outer male insertion members integral with and defining an upstream end of the vane assembly platform rings, said male insertion members having a thickness at room temperature less than said first distance;

wherein the vane assembly is mounted to the combustor solely by insertion of the inner and outer male insertion members between the spaced-apart portions of the respective inner and outer female retaining members, a radial gap being defined between said male insertion members and said respective female retaining members at room temperature, and said male insertion members and said respective female retaining members being disposed in radial sealing engagement at engine operating temperature while permitting at least relative axial displacement therebetween.

14. The combustor-to-vane joint assembly of claim 13 wherein there is an interference fit between the male insertion members and at least an innermost annular portion and an outermost annular portion of the spaced-apart annular portions of the female retaining members.

\* \* \* \* \*